United States Patent [19]

Sugama et al.

[11] 4,436,555

[45] Mar. 13, 1984

[54] MAGNESIUM PHOSPHATE GLASS CEMENTS WITH CERAMIC-TYPE PROPERTIES

[75] Inventors: Toshifumi Sugama, Mastic Beach; Lawrence E. Kukacka, Port Jefferson, both of N.Y.

[73] Assignee: The United States of America as represented by the United States Department of Energy, Washington, D.C.

[21] Appl. No.: 422,510

[22] Filed: Sep. 23, 1982

[51] Int. Cl.$^3$ .............................................. C04B 9/04
[52] U.S. Cl. ..................................... 106/85; 106/105; 501/111
[58] Field of Search ................... 106/85, 105; 501/111

[56] References Cited

U.S. PATENT DOCUMENTS

| | | | |
|---|---|---|---|
| 3,960,580 | 6/1976 | Stierli et al. | 106/85 |
| 4,059,455 | 11/1977 | Limes et al. | 501/111 |
| 4,218,256 | 8/1980 | Videtto | 106/85 |

*Primary Examiner*—James Poer
*Attorney, Agent, or Firm*—Margaret C. Bogosian; James W. Weinberger; Michael F. Esposito

[57] ABSTRACT

Rapid setting magnesium phosphate (Mg glass) cementitious materials consisting of magnesium phosphate cement paste, polyborax and water-saturated aggregate exhibiting rapid setting and high early strength characteristics. The magnesium glass cement is prepared from a cation-leachable powder and a bivalent metallic ion-accepting liquid such as an aqueous solution of diammonium phosphate and ammonium polyphosphate. The cation-leachable powder includes a mixture of two different magnesium oxide powders processed and sized differently which when mixed with the bivalent metallic ion-accepting liquid provides the magnesium glass cement consisting primarily of magnesium ortho phosphate tetrahydrate, with magnesium hydroxide and magnesium ammonium phosphate hexahydrate also present. The polyborax serves as a set-retarder. The resulting magnesium mono- and polyphosphate cements are particularly suitable for use as a cementing matrix in rapid repair systems for deteriorated concrete structures as well as construction materials and surface coatings for fireproof structures.

7 Claims, 3 Drawing Figures

MAGNESIUM PHOSPHATE GLASS CEMENTS WITH CERAMIC-TYPE PROPERTIES

BACKGROUND OF THE INVENTION

The invention described herein was made or conceived in the course of, or under Contract No. DE-AC02-76CH00016 between the U.S. Department of Energy and Associated Universities, Inc.

This invention relates generally to fast-setting, high strength, bonded aggregate compositions especially adapted for use as construction materials, and is particularly directed to improved magnesium phosphate-based cement compositions.

Magnesium oxide reacts with water and other aqueous solutions of certain salts to form compounds having cementitious properties. Magnesia cements have been known for over 100 years following the discovery that a cementitious material results from the interaction of magnesium oxide and magnesium chloride by Sorel. Magnesia cement is the active constituent in a large variety of concretes, mortars and plasters of limited and special application. Perhaps the most widely used magnesia cements are derived from the reaction of magnesium oxide with magnesium chloride and magnesium sulfate to form a more or less complex salt which can be characterized generally as a hydrate form of magnesium oxychloride, magnesium oxysulfate and calcium sulfate.

Magnesia cements possess many highly desirable properties useful over a wide variety of applications. For example, magnesia cements possess excellent fire retardant characteristics and may be easily reinforced with glass fibers to provide suitable strength to produce articles such as boat parts and building materials. In addition, these cements exhibit high strength, excellent binding and waterproofing characteristics, and relatively short setting times.

As a result of the versatility and utility of magnesia cements, much work has been carried out to further improve on these and other characteristics of these cements. For example, U.S. Pat. No. 4,158,570 to Irwin discloses a method of preparation of magnesium oxychloride and magnesium oxysulfate plastic cements by regulation of the mixing of the magnesium oxide with the magnesium chloride or magnesium sulfate solution to avoid sharp temperature increases in the mixture formed during the mixing cycle. The mixing procedure is conducted at low mixing speeds with reduced shear in eliminating the requirement for external cooling while maintaining the mixture at a minimum temperature to avoid premature setting of the cement. U.S. Pat. No. 3,667,978 to Vassilevsky et al discloses a hydraulic cement binder for both organic and inorganic fillers consisting of magnesium oxide, magnesium sulfate and an alkaline earth metal chloride in proportions such that a magnesium oxychloride/magnesium oxysulfate/alkaline sulfate hardenable mass is produced upon addition of water and setting. U.S. Pat. No. 3,921,717 to Danjushevsky et al discloses a binder for cementing wells at a temperature of 100° to 200° C. and a pressure not over 1000 atmospheres which includes blast furnace slag and magnesium oxide with a refractive index between 1.722 and 1.734. U.S. Pat. No. 3,652,305 to Cook discloses a multiple hydrated magnesium oxide formed from an aqueous solution of ammonium persulfate and a glycol ether processed with a solid mixture of magnesium oxide, aluminum oxide and sand to yield a heat curing cement having a dense vitreous surface and the ability to transition from an opaque crystalline form to an amorphous or glassy state by application of an external voltage. U.S. Pat. No. 3,743,525 to Farrauto et al discloses the preparation of a hyraulic cement from glass powders of the general composition $R_2O$-$RO$-$SiO_2$, wherein $R_2O$ consists of $Na_2O$ and/or $K_2O$ and $RO$ consists of $MgO$, $CaO$, $SrO$ and/or $BaO$. The addition of the $H_2PO_4^-$ anion to the glass powders enhances the compressive strength of the resultant cement and shortens the required setting time for the cement.

In order to improve the physical properties of the hardened magnesia cement, various investigations have been carried out with respect to, for example, calcining temperature for magnesia, type of magnesium salt, concentration of the aqueous solution of magnesium salt, and mixing ratio between the light magnesia and the aqueous solution of a magnesium salt. For example, the prior art discloses a suitable calcining temperature for active magnesia generally in the range from 700° to 800° C., because it was believed that if calcined at a higher temperature, the magnesia obtained would become less active. In addition, it was learned that magnesia cement containing magnesium chloride is superior to that containing magnesium sulfide in strength and shrinkage of the hardened material. Finally, it has been known also that a higher concentration of a magnesium salt in the aqueous solution is desirable and a higher ratio of active magnesia with respect to a magnesium salt results in higher strength and lower shrinkage of the hardened material. U.S. Pat. No. 4,003,752 to Isohata et al discloses a magnesia cement composition comprising active magnesia, magnesium sulfate, and pulp or a mixture of pulp and fibrous glass wherein the active magnesia is preferably of a type of relatively high activity with a low degree of sintering as obtained by calcining temperatures in the range from 600° to 1000° C.

From the above discussion it can be seen that the magnesium oxide must conform to rather rigid requirements with respect to both chemical composition and physical properties. Conditions of calcination and particle size affect rate of reactivity, volume change, and strength and must be adjusted to yield products conforming to specific requirements in respect to these properties.

In addition to carefully controlling magnesium oxide physical characteristics so as to impart desired properties in the magnesium-based cement, various other components have been added for selectively manipulating the characteristics thereof. For example, a non-hygroscopic rapid setting concrete composition produced by dry blending magnesium containing compounds, aluminum containing compounds, and phosphorous containing compounds such as liquid phosphoric acid and then pulverizing the blended material without a separate drying stage is disclosed in U.S. Pat. No. 3,525,632 to Enoch. Similarly, U.S. Pat. No. 3,821,006 to Schwartz discloses a method of repair using a two component system of a reactive component which is a mixture of an acid phosphate salt and magnesium oxide particles and an inert particulate aggregate which can be sand and silica. The proportion of the acid phosphate salt to magnesium oxide is maintained such that a continuous cementitious phase is formed during the reaction to form magnesium phosphate and surrounds the aggregate and the remaining magnesium particles. U.S. Pat. No. 3,960,580 to Stierli et al discloses a quick-setting magnesium oxide-ammonium phosphate concrete, the setting time of which may be extended by the addition of oxyboron compounds such as sodium borate. The oxyboron compound acts as a set-retarding agent and increases the compressive strength of the thus-retarded composition. U.S. Pat. No. 4,059,455 to Limes et al discloses mixtures of magnesia-containing aggregates with ammonium phosphates having a polyphosphate content ranging upward from about 20%, wherein the rapidity of setting and the early strength developed are inversely related to the polyphosphate content.

OBJECTS AND SUMMARY OF THE INVENTION

Therefore, in view of the above, it is an object of the present invention to provide an improved magnesium phosphate-based cement composition using materials readily available from commercial sources.

Another object of the present invention is to provide a high strength magnesium phosphate-based cement composition having a rapid setting characteristic.

Still another object of the present invention is to provide a magnesium phosphate-based cement composition capable of withstanding extremely high temperatures and thus useful as a high-strength fireproofing building material.

A still further object of the present invention is to provide a concrete, plaster, mortar and ceramic patching composition affording extremely high compressive and bonding strengths.

The present invention contemplates the formation of rapid setting magnesium phosphate cementitious materials prepared by mixing a cation-leachable powder such as calcined magnesium oxide with a bivalent metallic ion-accepting liquid such as an aqueous solution of diammonium phosphate and ammonium polyphosphate over a temperature range of $-25°$ C. to $+50°$ C. The magnesium oxide powder includes a mixture of a highly reactive magnesium oxide powder calcined at 18 900° C. and magnesium oxide powder calcined at $>1300°$ C. having a relatively low reactivity. The two cement-forming liquids are used as an aqueous solution, with one solution having a 40% diammonium phosphate content and the other having a 56% ammonium polyphosphate content which is used at curing temperatures of $<20°$ C. Disodium octaborate tetrahydrate (polyborax) is utilized as a set-retardant. The major product is magnesium ortho phosphate tetrahydrate with magnesium ammonium phosphate hexahydrate and magnesium hydroxide also present in lesser amounts. Subsequent heating of the cement to 1300° C. converts these three compounds to a single phase of anhydrous magnesium ortho phosphate. The resultant product exhibits a compressive strength of 7000 psi making it suitable as a construction or building material and is thermally stable in air at temperatures $>1000°$ C. allowing it to be used as a refractory material.

BRIEF DESCRIPTION OF THE DRAWINGS

The appended claims as set forth those novel features believed characteristics of the invention. However, the invention itself, as well as further objects and advantages thereof, will best be understood by reference to the following detailed description of a preferred embodiment taken in conjunction with the accompanying drawings, in which:

DETAILED DESCRIPTION OF THE PREFERRED EMBODIMENTS

Figure 1:
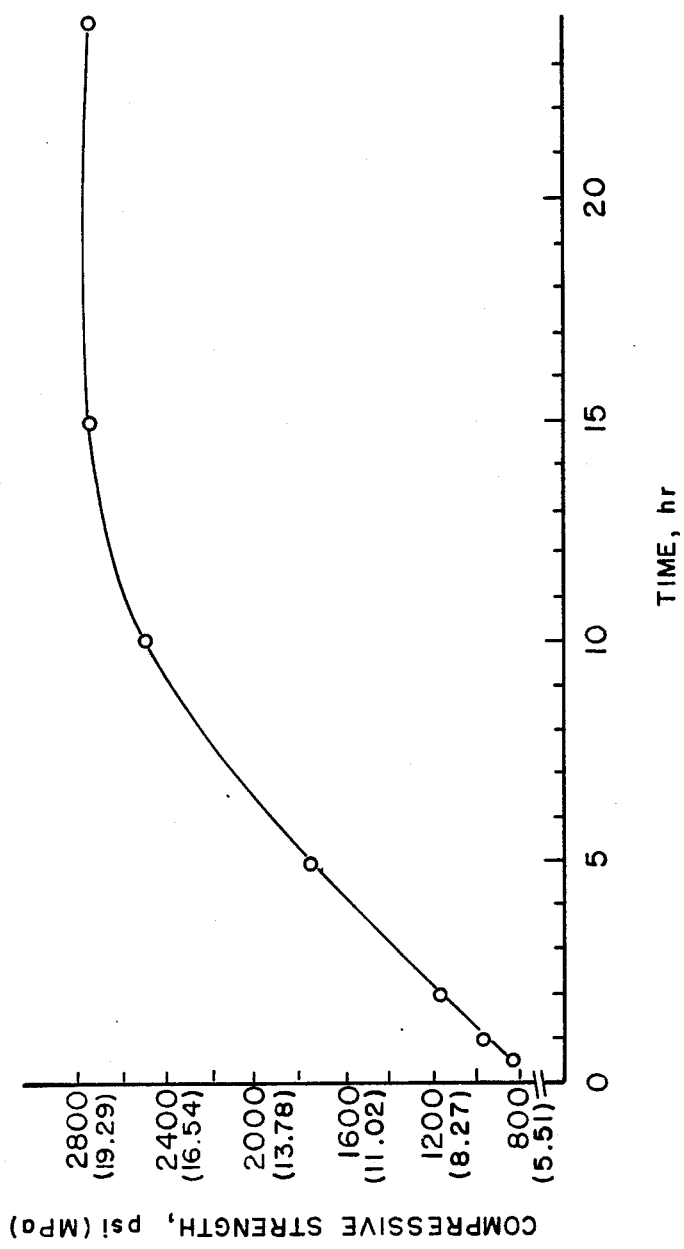
FIG. 1 is a graph illustrating the compressive strength of magnesium monophosphate cements in accordance with the present invention as a function of time.

The present invention contemplates a magnesium glass cement prepared from a cation-leachable powder and a bivalent metallic ion-accepting liquid such as an aqueous solution of diammonium phosphate and ammonium polyphosphate. The water-compatible magnesium glass cement consists of magnesium phosphate cement paste, polyborax and water-saturated aggregate exhibiting rapid setting and high early strength characteristics. The cation-leachable powder includes a mixture of two different magnesium oxide powders processed and sized differently and possessing different reactivities, which when mixed with the bivalent metallic ion-accepting liquid results in the formation of the magnesium glass cement consisting more specifically of magnesium ortho phosphate tetrahydrate, with magnesium hydroxide and magnesium ammonium phosphate hexahydrate also present. The polyborax serves the purpose of retarding the setting of the magnesium glass cement.

Hydrated magnesium ammonium phosphate compounds ($MgNH_4PO_4.nH_2O$) are readily formed as white crystalline precipitates when aqueous solutions of a phosphate containing ammonium hydroxide are mixed with a solution of magnesium salts. The rapid ionization of ammonium phosphate compounds most likely occurs as a first stage in these reaction processes and is associated with the liberation of an isoelectronic ammonium cation, $NH_4^+$, and hydroxide anion, $OH^-$, which are called isosteres. Simultaneously, an electropositive magnesium bivalent metallic ion is disassociated from the magnesium salt, and a supersaturated solution of the magnesium ammonium phosphate is formed from which the solid separates out. A certain concentration of liberated ammonium ions prevents the formation of magnesium hydroxide ($Mg(OH)_2$). This results in the equilibrium state of the corresponding isosteric conjugation between $NH_4^+$ and $OH^-$ ions. The aged precipitates of the $MgO-NH_4PO_4-H_2O$ system are hard and strong, but their solubility in water is increased by hydrolysis. Upon heating to 1100° C., the precipitated magnesium phosphate compounds undergo further reaction and are converted into magnesium pyrophosphate ($Mg_2P_2O_7$) which has ceramic-like properties. Hence, the formed $MgNH_4PO_4.nH_2O$ has the characteristic of rapid setting at an ambient temperature of $\sim 24°$ C. while being capable of withstanding elevated temperatures $>1000°$ C. due to the phase changes that occur in the $MgO-NH_4PO_4-H_2O$ system. Because of the strength, rapid setting and fireproof characteristics of the resulting compounds, the desirability of synthesizing a hydrolytically stable magnesium ammonium phosphate at room temperature by the polar reaction occurring between a liquid and solid phase is obvious.

In order to find an alternative $Mg^{2+}$ ion-accepting liquid, a concentrated aqueous solution of diammonium phosphate (DAmP) was mixed with magnesium oxide (MgO) powder. More specifically, the magnesium phosphate cementitious materials of the present invention were prepared from two components: a cation-leachable powder and a bivalent metallic ion-accepting liquid. The powder used was fine magnesium oxide (size, <200 mesh) calcined at >1300° C. and having a surface area of 1–3 meter$^2$/gram. The magnesium oxide powder served as a source of $Mg^{2+}$ ions while the cement-forming liquid was an aqueous solution of 40% diammonium phosphate, $(NH_4)_2HPO_4$.

To prepare the cement pastes, 68 parts of MgO powder were added to 32 parts of the diammonium phosphate (DAmP) hardener solution and after thoroughly mixing the two materials for ~30 seconds, they were poured into 12-mm diameter×75-mm long test tubes and allowed to harden at 24° C. for up to 24 hours. At various curing times, the samples were cut to cylinders for use in mechanical strength tests.

Compressive strength tests, the results of which are discussed below, were performed on cement specimens having a diameter of 12-mm and a length of 24-mm. The measurements were performed in triplicate with the average values shown in the various figures. Helium comparison pycnometry was used to measure the solid volume of the hardened cement specimens. Porosity was determined from the apparent volume and the solid volume. Cement setting reaction kinetics were determined by use of a DuPont 910 Differential Scanning Calorimeter (DSC) with a heating rate of 10° C./minute in nitrogen gas.

The compressive strength of the hardened cement pastes was measured after exposure of the samples to air at temperatures ranging between 24° C. and 1300° C. The results of these mechanical strength tests performed at various times on the test specimens and at an ambient temperature of 24° C. are shown in FIG. 1. From FIG. 1 it can be seen that the compressive strength increases very rapidly with age for ~15 hours, at which time a maximum strength of ~2800 psi (~19.29 MPa) is attained. It can also be seen that the samples exhibited a very rapid setting rate. The strengths at ages of 30 and 60 minutes averaged 820 psi (5.65 MPa) and 980 psi (6.75 MPa), respectively. The latter corresponds to 35% of the maximum strength measured. Therefore, marked characteristics of magnesium monophosphate cement are rapid setting and high early strength.

Figure 2:
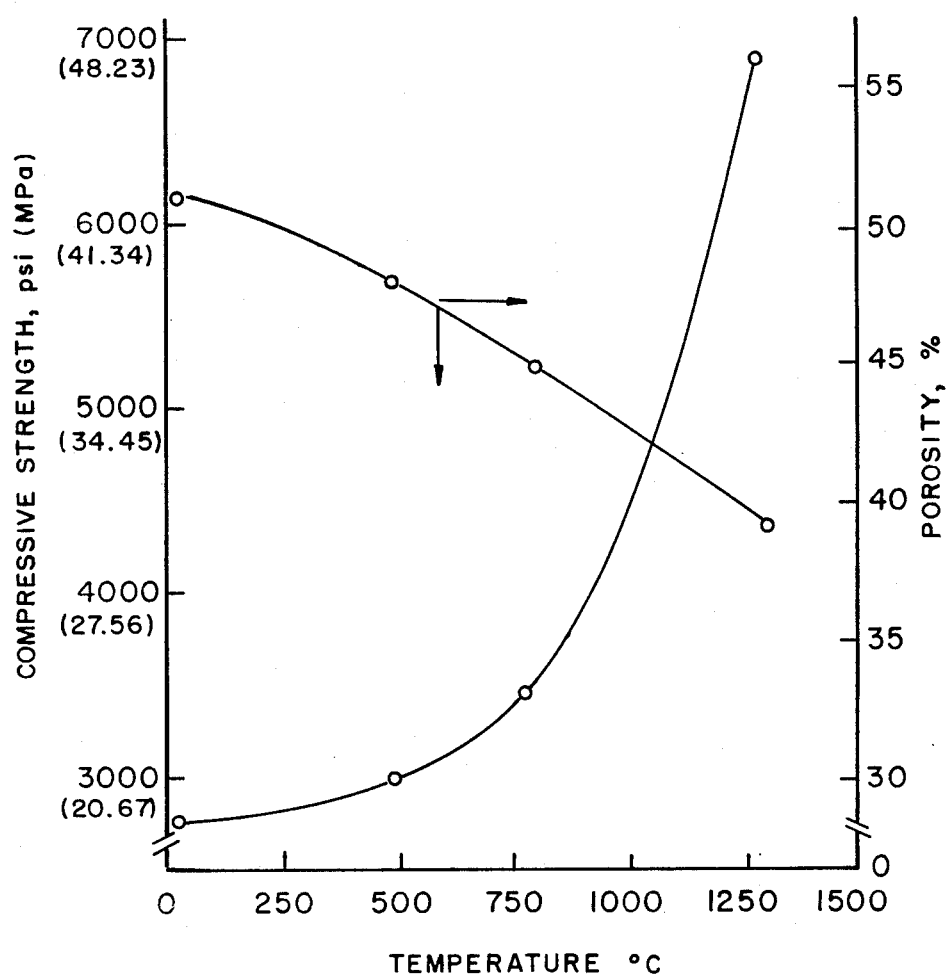
FIG. 2 shows a pair of curves illustrating the compressive strength and the porosity of hardened cement pastes in accordance with the present invention after exposure to air at elevated temperatures.

Experiments were also conducted in which compressive strength and porosity measurements were made after exposure of hardened cement specimens to air at temperatures up to 1300° C. for 10 hours. Prior to performance of these measurements, all of the test specimens were allowed to equilibrate at room temperature for ~24 hours. These results as a function of temperature are illustrated in FIG. 2. As shown therein, the compressive strength of the specimen increases slowly with increasing temperature up to 800° C., ranging from an average value of 2800 psi (19.29 MPa) at 24° C. to 3500 psi (24.12 MPa) at 800° C. Above 800° C., the strength increases markedly. At 1300° C., the strength was 7000 psi (48.23 MPa), two times greater than that of specimens at 800° C. The large strength enhancement above 800° C. seems to verify that the hydrated cement is converted into a ceramic-like material.

As is normally the case with cementitious materials, the porosity and strength are related. Porosity decreases resulted in increased strength. At 1300° C., the porosity was 38%, 27% less than that at 24° C.

Since the quick setting reaction between powdered magnesia and DAmP solution is a highly exothermic process, control of the rate of heat generation and temperature is very important in order to achieve the desired degree of cure of the product. Therefore, the aforementioned Differential Scanning Calorimetry (DSC) was used to obtain the kinetic parameters for the thermal reaction of cement pastes in a temperature range of 17° C. to 70° C. Measurement of the rate of heat evolution, expressed in mcal/sec, as a function of temperature is one of the most useful methods for determining the degree of reaction of cement. A total heat of reaction was calculated to be 33.6 cal/g using the DSC experimental test results and the following equation:

$$\Delta H = (A/m)(60 B E \Delta qS)$$

where
A=the peak area of the DSC thermogram;
m=the sample mass (mg);
60=a conversion factor (sec/min);
B=the time base setting (min/in.);
E=the cell calibration coefficient at the temperature of the experiment (dimensionless); and
$\Delta qS$=the measuring pen sensitivity [(mcal/sec)/in.].

Figure 3:
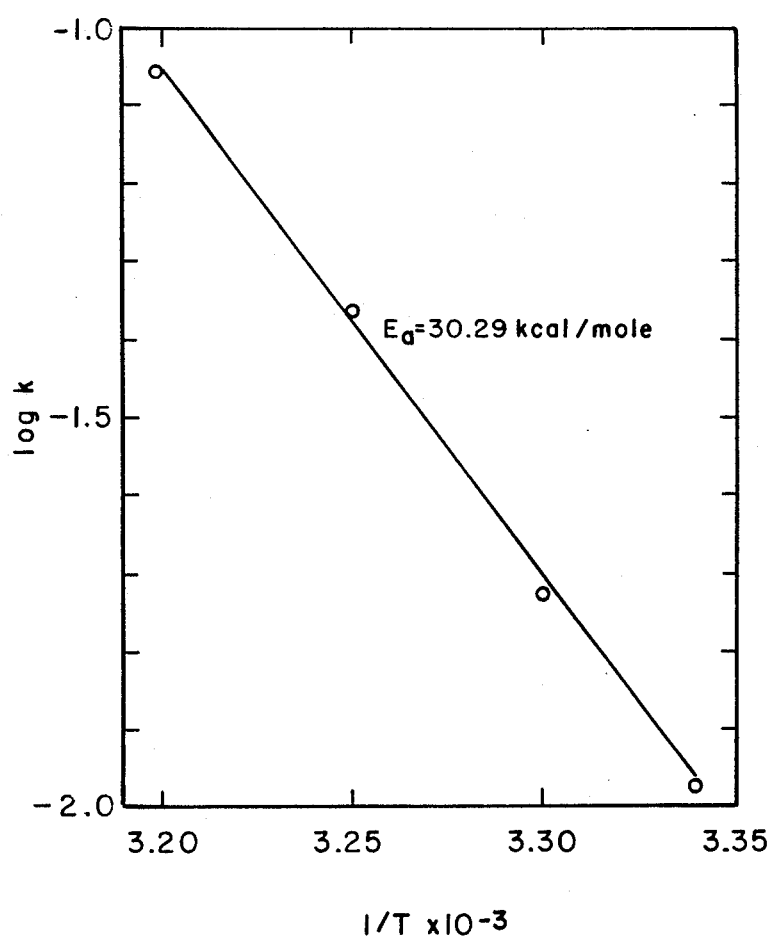
FIG. 3 shows the rate constants, k, assuming first-order reaction kinetics, versus the reciprocal of the reaction temperature from which the activation energy, $E_a$, of the cement paste of the present invention is determined.

In order to determine the activation energy, $E_a$, of the cement pastes, the rate constants, k, obtained from the Arrhenius expression, were calculated assuming first-order reaction kinetics. The rate constants are plotted against reciprocal temperature with the results shown in FIG. 3. The resulting curve is a straight line, verifying the occurrence of a first-order reaction. The value of $E_a$ as computed from the slope of the line of FIG. 3 is 30.29 kcal/mol. This value is more than two times greater than the 13.0–13.9 kcal/mole for the heat of polymerization of methyl methacrylate (MMA), a widely used binder for polymer concretes. Thus, the hardened magnesium monophosphate cement pastes may act as inorganic material having strong intermolecular bonding forces.

X-ray defraction analysis indicated the presence of three major hydrated magnesium compounds in the cement paste. Defraction peaks indicate that one of the reaction products is magnesium ammonium phosphate hexahydrite ($MgNH_4PO_4.6H_2O$). The other magnesium compounds present are magnesium ortho phosphate tetrahydrate $Mg_3(PO_4)_2.4H_2O$ and magnesium hydroxide ($Mg(OH)_2$). The defraction results showed the presence of a relatively large quantity of the crystalline phase of magnesium ortho phosphate tetrahydrate in the hardened cement pastes. Upon heating of the cement to 1300° C., the presence of magnesium-based compounds identified as unhydrated magnesium ortho phosphate, $Mg_3(PO_4)_2$ appeared. Also, the absence of the diffraction lines representing magnesium ortho phosphate tetrahydrate and magnesium hydroxide indicate the thermal decomposition of magnesium hydroxide and the dehydration of the magnesium ammonium phosphate tetrahydrate as a result of the heating at 1300° C. The anhydrous MgO produced by the decomposition of the $Mg(OH)_2$ may have further reacted with the $MgNH_4PO_4.6H_2O$ to yield $Mg_3(PO_4)_2$, the most abundant compound formed at the elevated temperatures. Consequently, all of the hydrated Mg compounds formed at 24° C. were converted into $Mg_3(PO_4)_2$ as a result of phase changes which occur as the temperature is increased.

Infrared (IR) spectra for the cement paste samples indicated that the Mg cation disassociated from the MgO pastes in forming a complex with up to six molecules of water in the form of an octahedral structure. Also neutral $H_2O$ molecules were indicated to be coordinated to $Mg^{2+}$ metallic ions formed in MgAmP complex compounds. The reaction of magnesia with water was indicated by the presence of magnesium hydroxide $(Mg(OH)_2)$. The most prominent frequency in the IR spectrum corresponded to the presence of the hydrated magnesium phosphate compounds such as $NH_4MgPO_4.6H_2O$ and $Mg_3(PO_4)_2.4H_2O$, as identified by the previously discussed X-ray diffraction analysis. The intensities of the bands represented by these hydrated magnesium phosphate compounds is reduced markedly by increased temperature and is attributed to vaporization of coordinated water and ammonia molecules from the complexes and dehydration of $Mg(OH)_2$ formations. The disappearance of the coordinate $H_2O$ molecules and the $NH_4^+$ ions stretching frequencies when the samples were heated to 1300° C. suggests that the hydrated magnesium ammonium phosphate compounds are converted into anhydrous magnesium phosphate compounds. In addition, the magnesia produced by thermal decomposition of $Mg(OH)_2$ may further react with the magnesium monophosphate to form magnesium ortho phosphate. This consists of a cross-linking structure of metal ions connected between the magnesium monophosphate molecules.

The following examples illustrate the preparation of a magnesium phosphate (Mg glass) cement concrete consisting of a magnesium phosphate cement paste, polyborox, and water-saturated aggregate. All starting materials used in this invention are commercially available source materials. The Mg glass cementitious materials were prepared from two components, a cation-leachable powder and a bivalent metallic ion-accepting liquid. The powder used included a two technical grade magnesium oxide (MgO) powder calcined at the temperature range of 1600° to 900° C. One powder was a low reactivity MgO (designated MgO #10) calcined at greater than 1300° C. and having a surface area of 1 to 3 m²/g. The second MgO powder (designated MgO #30) was calcined at approximately 900° C. and its surface area was 18 to 20 m²/g. This MgO #30 powder is highly reactive and was used primarily at curing temperatures less than approximately 10° C. Two cement-forming liquids were used as an aqueous solution. One liquid was a 40% diammonium phosphate (DAmP) solution. The second liquid was a 56% ammonium polyphosphate (termed poly-N) and was used at curing temperatures less than approximately 20° C. Polyborax $(Na_2O.4B_2O_3.4H_2O)$ having a four mole boric oxide $(B_2O_3)$ in the sodium borax compounds was used as a set-retardant at a concentration of 0.5 to 20% by weight of ammonium phosphate solution. Silica-type aggregate was used having a moisture content of 5% by weight of the total aggregate.

EXAMPLE I

At an ambient temperature of 50° C., the following mix composition was provided to prepare the Mg glass cement concrete.

| Ingredients | % by Weight |
| --- | --- |
| Magnesium oxide (MgO#10) | 30 |
| 40% diammonium phosphate (hardener solution) | 16 |
| Polyborax retarder | 5 (by weight of hardener solution) |
| Aggregate mix* (5.0% water) | 54 |

*Aggregate = 60 wt % coarse aggregate (size, 18.8 mm to 1.19 mm) - 40 wt % fine aggregate (size, 1.19 mm to 0.149 mm).

The powdered polyborax retarder is added directly to the hardener solution, and then mixed for approximately 5~10 minutes to achieve a complete dissolution of polyborax. The wet aggregate is mixed with the MgO powder by hand for about 2 minutes, followed by the addition of the mixture of 40% DAmP and polyborax retarder and finally mixed by hand for about 1 minute. Low viscosity slurries that are self-levelling are produced. The slurry was cast into 3.5 cm (diameter)×10 cm (long) cylinders and allowed to cure in air for one hour at 50° C. The resultant Mg glass concrete gels in 3 minutes and 10 seconds and compressive strength at an age of one hour was approximately 2000 psi (13.78 MPa).

EXAMPLE II

Example I was repeated except that the polyborax retarder content was increased to 6, 8, and 10%, respectively. Test results from these samples are given in Table I. As shown, the gel time increases with the polyborax concentration. The addition of 10% polyborax by weight of hardener solution results in the gel time being approximately 7 minutes and 30 seconds longer than that for the sample without polyborax retarder. However, the one hour compressive strength of specimens made with 10% polyborax was 1200 psi, approximately 46% lower than that of specimens without the retarder. The results appear to indicate that the addition of polyborax could possibly be used as a method to extend the gel time (working time) of Mg glass cementitious materials under high temperature environment conditions.

TABLE I

Effect of Polyborax on Gel Time of Mg Glass Cement Concrete at 50° C.

| Polyborax, % | Gel Time, min:sec | 1-hr Compressive Strength, psi |
| --- | --- | --- |
| 0 | 1:00 | 2231 |
| 5 | 3:10 | 2000 |
| 6 | 4:40 | 1720 |
| 8 | 6:05 | 1450 |
| 10 | 8:30 | 1200 |

EXAMPLE III

At −25° C., the following mix designs was used to prepare the Mg glass concrete at low temperatures. The mix compositions of Mg glass cement at less than approximately 10° C. was characterized by substituting the polyborax retarder and DAmP hardener solution for the highly reactive MgO#30 powder and the ammonium polyphosphate hardener solution.

| Ingredients | % by Weight |
| --- | --- |
| Magnesium oxide (MgO #10) | 17.5 |

-continued

| Ingredients | % by Weight |
|---|---|
| Magnesium oxide (MgO #30) | 7.5 |
| 56% ammonium polyphosphate (hardener solution) | 28.6 |
| Frozen aggregate mix* (50% water) | 46.4 |

*Aggregate = 60 wt % coarse aggregate (size, 18.8 mm to 1.19 mm) - 40 wt % fine aggregate (size, 1.19 mm to 0.149 mm).

The frozen aggregate was mixed with the mixture powders of MgO#10 and MgO#30 by hand for about 2 minutes. Ammonium polyphosphate hardener solution was then added to the mixture of aggregate and MgO powder and mixed by hand for about 1 minute. The slurry was cast into 3.5 cm (diameter)×1 cm (long) cylinders and allowed to cure in air for 1 hour at −25° C. The resultant Mg concrete gelled in approximately 10 minutes and the 1 hour compressive strength was approximately 2000 psi.

Based upon the experimental results described above, the interaction mechanisms involved in the formation of the magnesium phosphate cementitious material are believed to be as follows. When an an aqueous solution of DAmP is mixed with MgO powder, the MgO grains are acted upon by water in DAmP solution to form $Mg^{2+}$ bivalent metallic ions. When the $Mg^{2+}$ ions are liberated from the MgO as a proton-leachable powder, they act as structure-forming cations. Conversely, the nucleophilic DAmP solution is a proton-accepting liquid having three electronegative oxygen atoms in its molecule. The $O^-$ anion is highly polarizable and susceptible to attack by protons. Thus, the progressive introductions of $Mg^{2+}$ ions into the decomposable DAmP molecules rapidly breaks hydroxyl groups, —OH, and —$O^-$ $(NH_4)^+$ links and subsequently the hydrogen proton, $H^+$, and ammonium ions, $NH_4^+$, are displaced by active $Mg^{2+}$ metal ions. The formation of $Mg^{2+}$ ions connected between the electronegative oxygen of DAmP leads to a change in phase from liquid to gel and the setting of the cement. During the subsequent hardening phase, two hydrated magnesium phosphate compounds, $MgNH_4PO_4.6H_2O$ and $Mg_3(PO_4)_2.4H_2O$, are formed and set within a few minutes. $Mg^{2+}$ ions associated in the compounds are characterized by their ability to form two different bond structures. One is a ring structure of $Mg^{2+}$ neutral lattice which connects electrically the two oxygen atoms, and the other is the formation of bridging $Mg^{2+}$ ions crosslinked between the phosphate molecules in the presence of $Mg^{2+}$ ring structures. The latter is generally classified as a magnesium ortho phosphate-type structure,

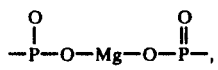

formed by de-ammonation.

The Mg cation locked in the magnesium ortho phosphate lattice are present in 4-fold coordination of water molecules, and this complexed compound is called magnesium ortho phosphate tetrahydrate. On the other hand, $Mg^{2+}$ formed in magnesium ammonium phosphate complexes up to six molecules of water in the form of an octahedral structure, and this compound is called magnesium ammonium phosphate hexahydrate. The neutral $H_2O$ molecules coordinated to $Mg^{2+}$ ions are stable enough to remove water vapor from ordinary air at ambient temperature. During setting, magnesium hydroxide $(Mg(OH)_2)$, also reacts with the hydrated magnesium phosphate compounds. Hence, the hardened cement paste is a hybrid consisting of multiple phases. Upon heating the composition to 1300° C., two moles of $MgNH_4PO_4.6H_2O$ undergo further reaction with one mole of MgO to form anhydrous magnesium ortho phosphate $(Mg_3(PO_4)_2)$, and simultaneously the dehydration of $Mg_3(PO_4)_2.4H_2O$ occurs. The $Mg(OH)_2$ is thermally decomposed to form MgO.

There has thus been shown the composition of and method of making a water-compatible magnesium phosphate (Mg glass) cementitious material consisting of magnesium phosphate cement paste, polyborax and water-saturated aggregate exhibiting rapid setting and high early strength characteristics. The magnesium glas cement is prepared from a cation-leachable powder, such as a mixture of two different magnesium oxide powders processed and sized differently, which is mixed with a bivalent metallic ion-accepting liquid, such as an aqueous solution of diammonium phosphate and ammonium polyphosphate, to produce a magnesium glass cement consisting primarily of magnesium ortho phosphate tetrahydrate, with magnesium hydroxide and magnesium ammonium phosphate hexahydrate also present.

While particular embodiments of the present invention have been shown and described, it will be apparent to those skilled in the art that changes and modifications may be made therein without departing from the invention in its broader aspects. The aim of the appended claims, therefore, is to cover all such changes and modifications as fall within the true spirit and scope of the invention.

The embodiments of the invention in which an exclusive property or privilege is claimed are defined as follows:

1. A method of making a fast-setting magnesium glass cementitious material comprising the steps of:
   heating a first magnesium oxide powder to a temperature of about 900° C., said first magnesium oxide powder having a surface area in the range of 18–20 square meters per gram;
   heating a second magnesium oxide powder to a temperature greater than 1300° C., said second magnesium oxide powder having a surface area in the range of 1–3 square meters per gram;
   mixing said first and second magnesium oxide powders with a aggregate; and
   mixing an aqueous ammonium polyphosphate solution with the mixture of said aggregate and said first and second magnesium oxide powders in forming said fast-setting magnesium glass cementitious material.

2. The method of claim 1 wherein said ammonium polyphosphate solution consists of 56% ammonium polyphosphate.

3. A water-compatible magnesium glass content consisting of:
   a cation-leachable powder including a first highly reactive magnesium oxide powder and a second magnesium oxide powder having a lower reactivity;
   a bivalent metallic ion-accepting liquid;
   an aggregate mix; and
   polyborax for controlling the setting of said magnesium glass cement.

4. The magnesium glass cement of claim 3 wherein said bivalent metallic ion-accepting liquid is an aqueous solution of diammonium phosphate.

5. The magnesium glass cement of claim 3 wherein said first magnesium oxide powder is initially heated to a temperature of about 900° C. and said second magnesium oxide powder is initially heated to a temperature greater than 1300° C., with said first magnesium oxide powder having a surface area larger than said second magnesium oxide powder.

6. A method of making a fast-setting magnesium glass cementitious material comprising the steps of:

heating a magnesium oxide powder to a temperature greater than 1300° C., said magnesium oxide powder having a surface area of 1-3 square meters per gram;

mixing powdered polyborax with a 40% diammonium phosphate solution;

mixing said magnesium oxide powder with a wet aggregate mix; and mixing said powdered polyborax and diammonium phosphate solution with said magnesium oxide powder and wet aggregate mixture to form said magnesium glass cementitious material wherein the respective parts by weight in forming said magnesium glass cementitious material are: magnesium oxide—30%; diammonium phosphate—16%; polyborax—5% of said diammonium phosphate solution; and aggregate mix—54%.

7. The method of claim 6 further comprising the step of selectively increasing the amount of polyborax mixed with said diammonium phosphate solution for selectively increasing the setting time of said magnesium glass cementitious material.

* * * * *